United States Patent [19]  [11] 4,131,143
Mayo  [45] Dec. 26, 1978

[54] APPARATUS FOR CUTTING FLOOR TRUSS WEB COMPONENTS

[75] Inventor: George L. Mayo, Fort Worth, Tex.

[73] Assignee: Speed-Saw, Inc., Corvallis, Oreg.

[21] Appl. No.: 829,056

[22] Filed: Aug. 30, 1977

[51] Int. Cl.² .......................... B27M 3/08; B26D 1/14
[52] U.S. Cl. ........................................ 144/30; 83/380;
83/390; 83/460; 83/471.3; 83/488; 144/2 R;
144/133 R
[58] Field of Search ............ 144/2 R, 3 R, 30, 119 R,
144/121, 134 R, 136 R, 198 R, 203, 133 R, 323;
83/2, 3, 5, 453, 460, 471.2, 471.3, 472, 473, 484,
485, 487, 488, 477, 508, 559, 560, 613, 380, 390,
399, 400

[56] References Cited
U.S. PATENT DOCUMENTS

| 2,510,820 | 6/1950 | Hermanson | 144/87 |
| 2,918,950 | 12/1959 | LeTarte | 83/471.3 |
| 3,470,924 | 10/1969 | Short | 144/133 R |
| 3,620,270 | 11/1971 | Jureit | 144/2 R |
| 3,757,625 | 9/1973 | Pfenning et al. | 144/30 |
| 3,799,224 | 3/1974 | Vizziello et al. | 144/133 R |
| 3,888,152 | 6/1975 | Barton | 83/471.3 |
| 3,910,142 | 10/1975 | Jureit et al. | 83/485 |

Primary Examiner—J. M. Meister
Assistant Examiner—W. D. Bray

[57] ABSTRACT

A machine for producing web components for wooden floor trusses from dimensioned lumber cuts the web components with a high degree of accuracy and uniformity rapidly on a repetitive basis. Each workpiece, such as a 2 × 4, is cut by the machine into two pieces on each cycle of operation and each piece will be provided with two angled converging end faces which define an included angle of 90°. The apparatus includes a base on which coacting rotary cutter heads are mounted through the medium of a carriage which is reciprocated relative to clamped workpieces by a linear actuator which forms a part of a hydro-pneumatic machine cycle control system. All vital apparatus adjustments are provided. Sturdiness and simplicity of construction and operation are featured in the apparatus.

24 Claims, 19 Drawing Figures

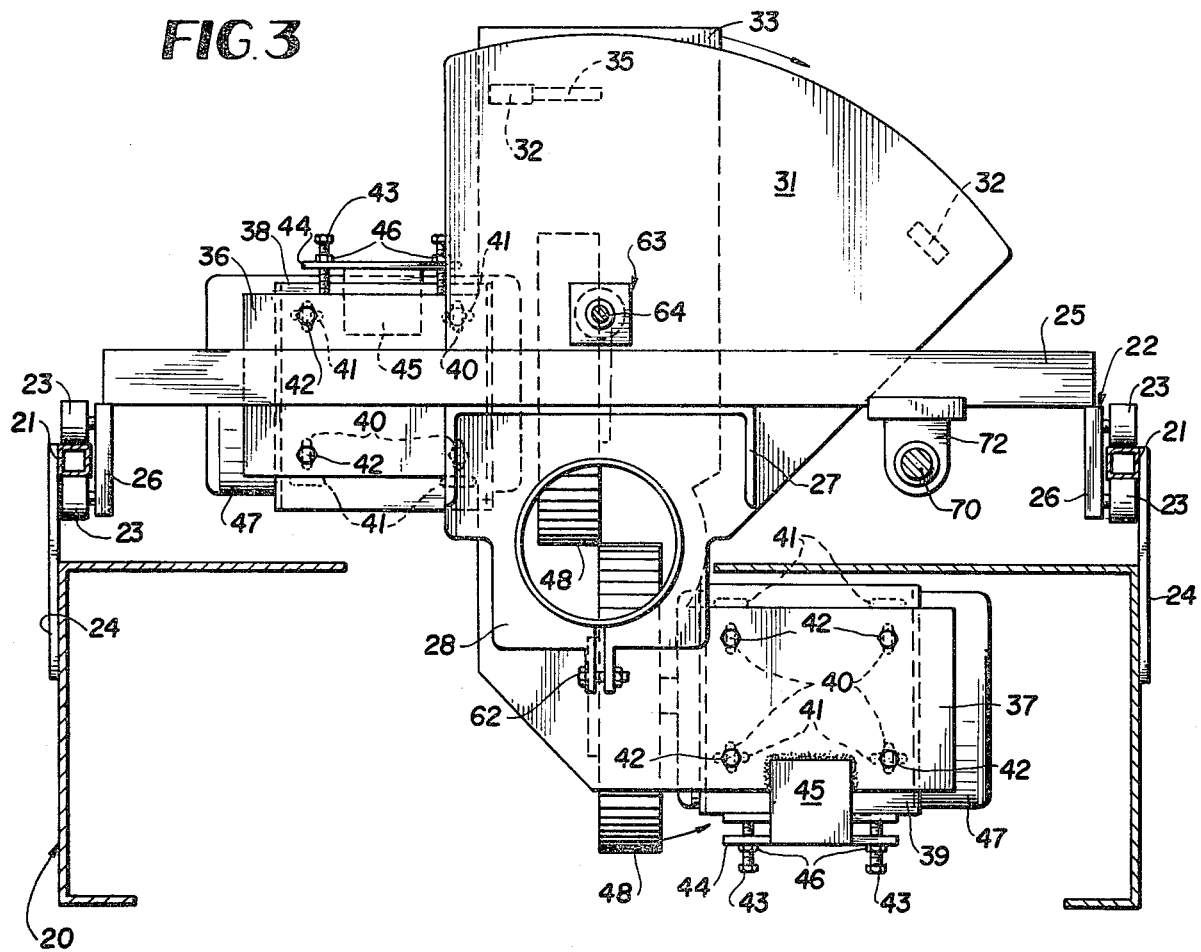
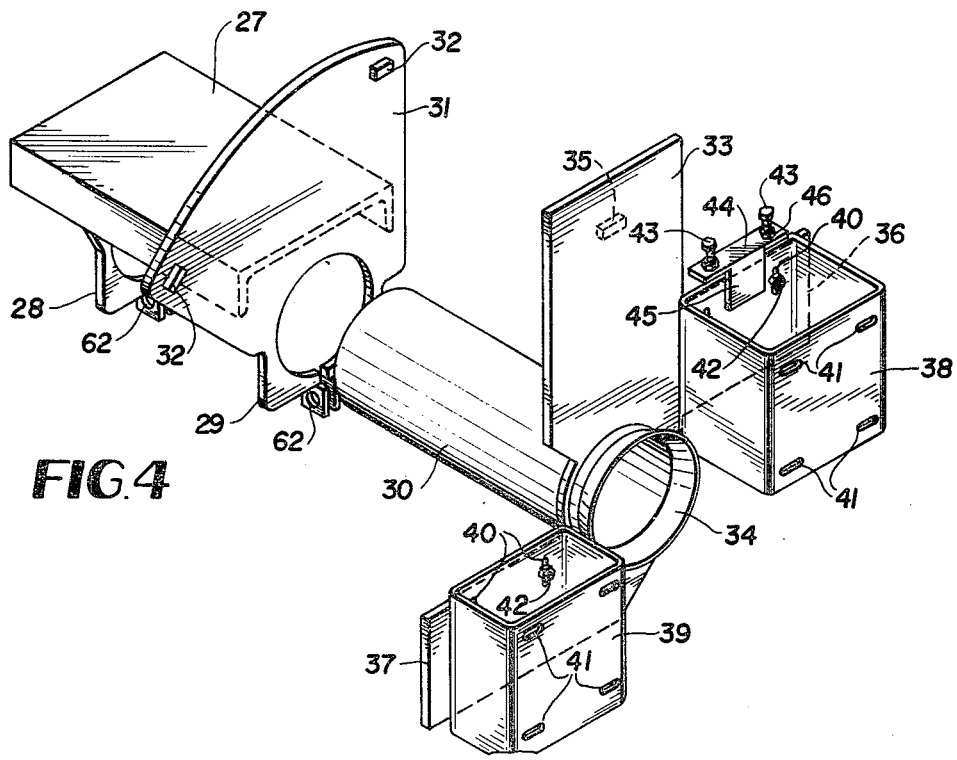

APPARATUS FOR CUTTING FLOOR TRUSS WEB COMPONENTS

BACKGROUND OF THE INVENTION

The present invention has come into being as a result of a need for fabricated wooden trusses to be used as a substitute for traditional floor joists cut from dimensioned lumber such as 2 × 10 or 2 × 12 lumber which is increasingly difficult to obtain. To be a satisfactory substitute for the traditional one-piece joist, the wooden floor trusses must be produced economically on a mass scale with dimensional accuracy and uniformity. Most particularly, the truss web braces or components must have their angled end faces cut with a high degree of accuracy and repeatability so that when the truss members are joined by metal plates, all joints will be tight fitting and gap-free to assure adequate strength in the truss. The present invention is embodied in a machine for completely satisfying the above need on an economical and entirely practical mass production basis. Therefore the machine of the invention is a specialized machine tailored to the solution of one particular problem, as above noted.

Various lumber cutting and mitering machines of some relevance are known in the prior art and examples of the patented prior art are disclosed in the following United States patents:
2,171,541
2,918,950
3,251,388
3,289,662
3,298,097
3,620,270
3,854,360
3,888,152.

None of the known prior art machines is capable of producing truss web components with the high degree of uniformity and dimensional accuracy demanded by the particular end product use and on a mass production scale sufficient to render the machine fully practical. The present invention fully provides such capability in a simplified, rugged and comparatively inexpensive arrangement. The machine is efficient and very reliable in its operation and easy to adjust and maintain. Other features and advantages of the invention will become apparent during the course of the following description.

BRIEF DESCRIPTION OF THE DRAWINGS

FIG. 3 is a transverse vertical section taken on line 3—3 of FIG. 1.

FIG. 4 is a fragmentary perspective view of an adjustable mount for rotary cutting heads and associated elements.

DETAILED DESCRIPTION

Figure 1:
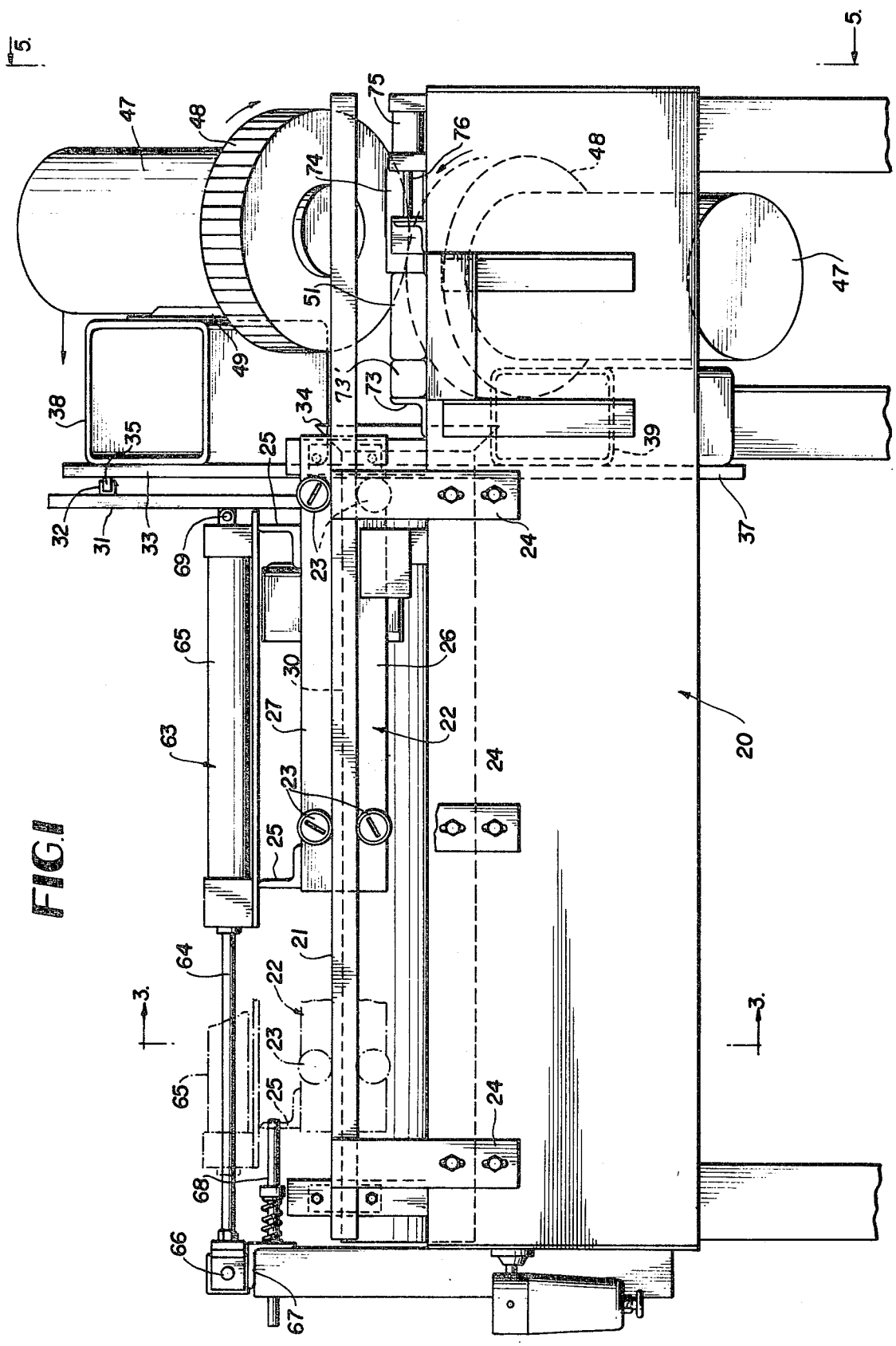
FIG. 1 is a side elevation of an apparatus for cutting truss web components embodying the invention.

Referring to the drawings in detail wherein like numerals designate like parts, an apparatus for cutting truss web components according to the invention comprises a sturdy machine base 20 including a pair of elevated parallel longitudinal support and guide rails 21 for a carriage 22 having fore and aft pairs of guide rollers 23 engaging the top and bottom sides of the rails, as shown. The rails are rigidly secured to the apparatus base 20 by a series of vertically adjustable support elements 24 on opposite sides of the base.

The carriage 22 further comprises a pair of cross bars 25 rigidly joined at their ends to longitudinal plates 26 on which the guide rollers 23 are mounted. A channel member 27 is rigidly secured centrally to the bottoms of the carriage cross bars 25. Split bearings 28 and 29, FIG. 4, for the rotational support of a cylindrical tube 30 are fixedly mounted on the channel member 27 as by welding and depend from the channel member so that the tube 30 is supported therebelow on the carriage structure. At the forward end of channel member 27, a vertical sector plate 31 is formed integrally with the split bearing 29 and rises therefrom and has a pair of rigid angle stops 32 fixed on its forward face to establish the limits of rotation of the tube 30, as will be further explained.

A coacting vertical plate 33 rises from the tube 30 near the leading end of the tube which preferably has a flared mouth 34. The plate 33 has a single stop lug 35 on its rear face which can rotate with the tube 30 between the limits of rotation established by the relatively stationary stop elements 32 of sector plate 31. When the tube 30 is assembled through the bores of bearings 28 and 29, the two plates 33 and 31 are in closely spaced parallel relationship, as shown in the drawings, with the stop elements 32 in the path of movement of the lug 35.

A pair of cutter motor base plates 36 and 37 in a common vertical plane with the plate 33 are rigidly attached, respectively, to one side of the plate 33, FIG. 4, and to the remote side of tube 30 near the flared mouth 34 as by welding. Rectangular tubular motor mounting brackets 38 and 39 are disposed on the forward faces of base plates 36 and 37 and the rear vertical walls of tubular brackets 38 and 39 have vertical adjusting slots 40 while their forward vertical walls adjacent the cutter motors have horizontal adjusting slots 41. Bolts 42 serve to attach the rear walls of brackets 38 and 39 to the respective base plates 36 and 37 and prior to tightening the bolts 42, the bracket 38 is accurately adjusted along the slots 40 by adjusting screws 43 having threaded engagement in the web 44 of the angle bracket whose vertical web 45 is fixed to the bracket 38. Bracket 39 is accurately adjusted along slots 40 by adjusting screws 43 having threaded engagement in the web 44 of the angle bracket whose vertical web 45 is fixed to the base phase 37. After the accurate adjustment of the brackets 38 and 39 are made in this manner, the bolts 42 are tightened and the adjusting screws 43 are secured by lock nuts 46.

Figure 7:
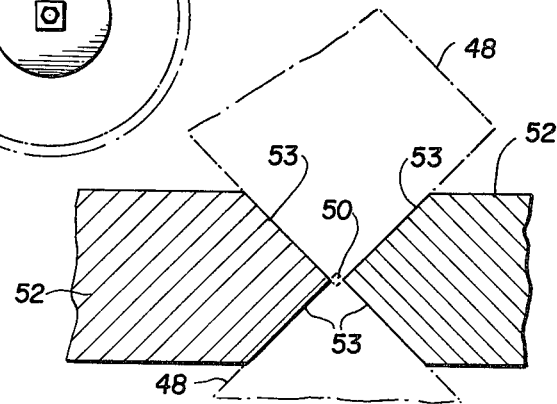
FIG. 7 is an enlarged cross sectional view showing the relationship of overlapping rotary cutters to a workpiece being cut.

A pair of electric motors 47 driving Dado rotary cutter heads 48 have mounting pads 49 for bolting to the forward vertical walls of tubular brackets 38 and 39 with the bolts 49' attaching the motors to the brackets engaging through the horizontal adjusting slots 41 so that the Dado heads and their motors can be adjusted in a second direction at right angles to the slots 40. The purpose of these described fine adjustments of the Dado cutter heads is to assure that the peripheral edges of the cutter heads 48 will coincide with the axis of tube 30 as illustrated in FIG. 3. Also, the two right angular adjustments allow the peripheral edges of the Dado heads 48 to overlap slightly at 50, FIGS. 5 and 7, to assure cutting entirely through the workpiece, such as a 2 × 4, 51, for cutting the same cleanly into two pieces 52, FIG. 7, with each piece 52 having formed thereon accurately a pair of right angular converging end faces 53. The invention assures that the angled end faces 53 can be cut on a rapid repetitive basis by the apparatus with uniformity and a high degree of accuracy, as previously noted.

Figure 8:
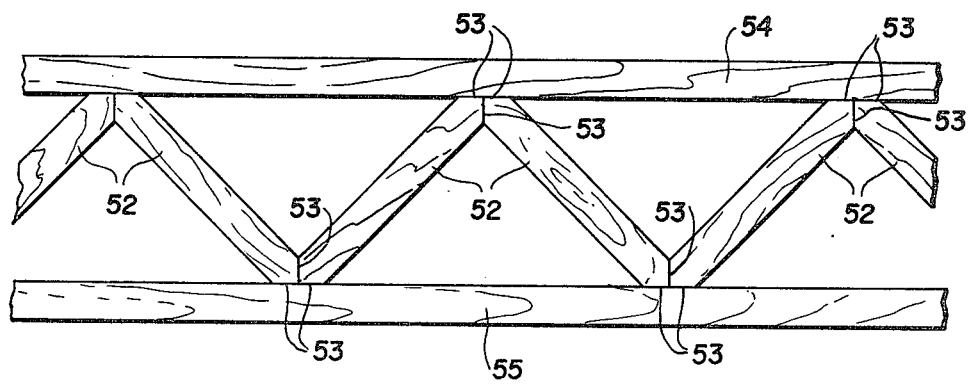
FIG. 8 is a fragmentary side elevation of a wooden floor truss having truss web components produced by the invention apparatus.

Referring to FIG. 8, a wooden floor truss is shown in which the inclined web components are made up from the cut sections 52 of dimensioned lumber produced by the invention apparatus. The accurately cut angled end faces 53 of adjacent web components 52 are in abutment with no gapping and the end faces 53 at the tops and bottoms of the web components 52 similarly abut the top and bottom longitudinal members 54 and 55 of the wooden truss. The wooden components are joined in assembled relationship at the various joints by metal plates, not shown.

Figure 2:
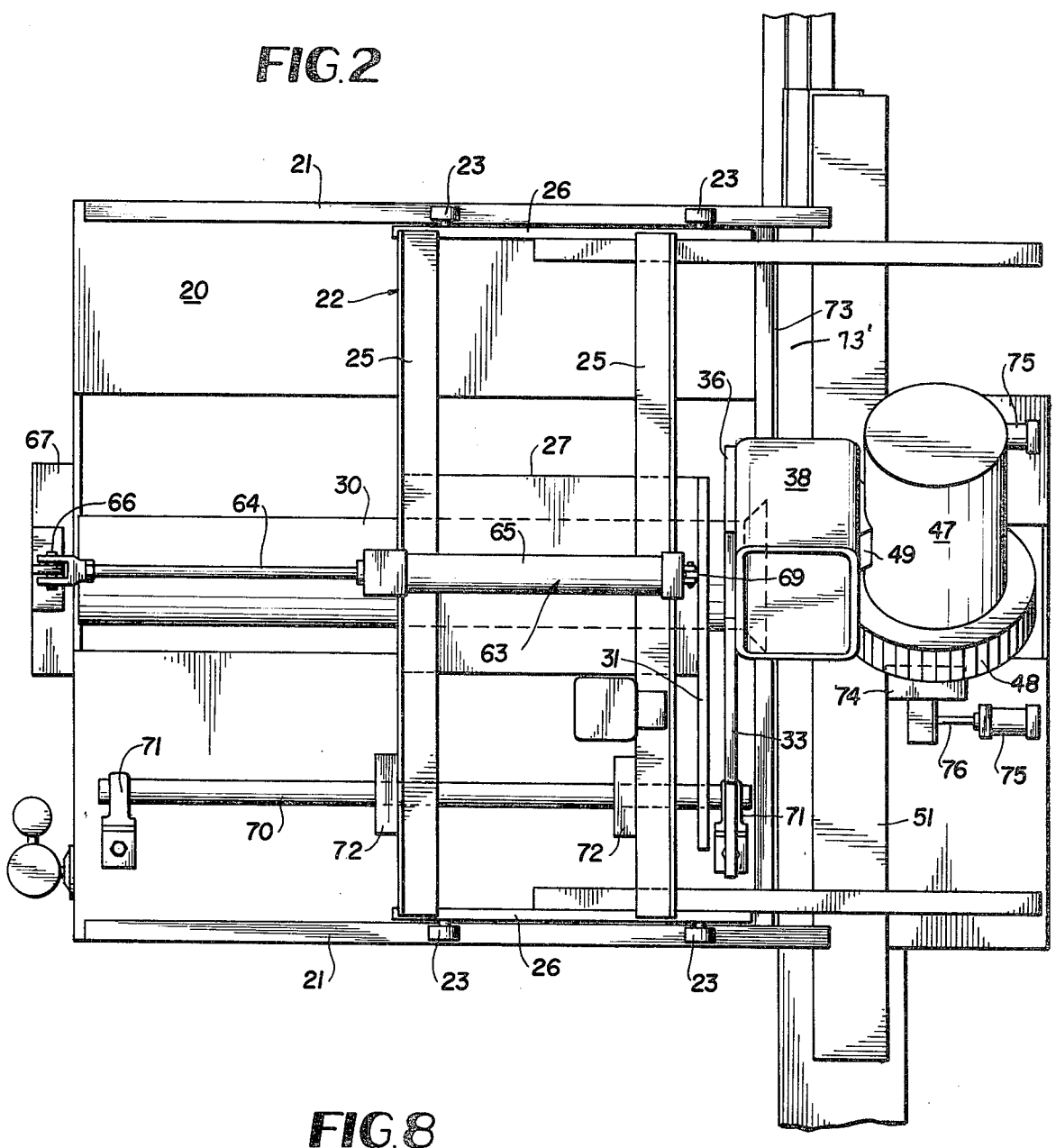
FIG. 2 is a plan view of the apparatus.
Figure 5:
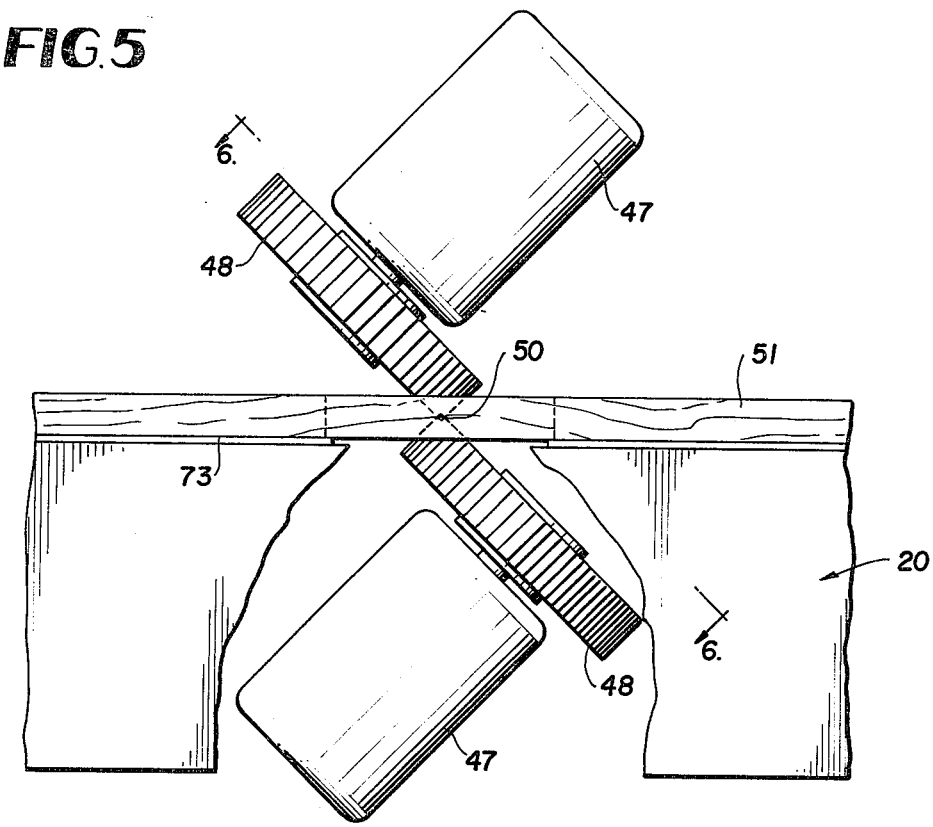
FIG. 5 is an elevational view takn on line 5—5 of FIG. 1.

The Dado cutter heads are not utilized during the operation of the machine in the vertical positions shown in FIG. 3. This is a calibrating or adjusting position in which the peripheral faces of the cutters 48 are parallel to the horizontal machine base during adjustment of the cutter heads by the screws 43 and associated parts, as described. At such time, the stop lug 35 on rotatable plate 33 is against the 90 degree stop element 32 of sector plate 31. During actual operation of the apparatus, the two coacting Dado cutter heads 48 are in an intermediate inclined position as depicted in FIGS. 1, 2 and 5. To facilitate quick adjustment and locking of the cutter heads with the plate 33 and rotary tube 30 on the carriage 22, in a required angular position, a manual over-center clamp 56 is provided having one jaw 57 thereof secured at 58 to the top of plate 33 and the other jaw 59, with engaging elements 60, adapted to clamp the sector plate 31. The over-center clamp has handles 60 which are squeezed causing the internal mechanism to move over dead center and maintain a clamping condition. When the handles are separated, the mechanism again moves over dead center to release the clamp. Thus, when the clamp handles 61 are squeezed together, the device 56 will hold the two plates 33 and 31 in any selected relative angular position. The clamp 56 is released whenever it is desired to turn the plate 33 and tube 30 with associated elements relative to the sector plate 31. The two split bearings 28 and 29 are adjustable at 62 to exert any desired degree of drag on the rotary tube 30.

The relative directions of rotation of the Dado blades 48 are indicated by arrows in FIG. 1. During cutting of a workpiece 51, this rotation directs sawdust in an air current rearwardly through the bore of the tube 30 so as to expel the sawdust at the rear end of the machine.

The entire carriage 22 with the two cutter heads and their motors is reciprocated at proper times on the horizontal rails 21 by operation of a longitudinal cylinder-piston actuator 63 whose piston rod 64 extends rearwardly of a cylinder 65 of the actuator and is coupled as at 66 to a stationary member 67 on the rear end of the machine base above the rails 21. A spring-loaded bumper pin 68 is provided on the machine base in the path of movement of the rear cross bar 25 to cushion the carriage at the rearward end of its travel. The forward end of cylinder 65 is coupled at 69 to the rear of sector plate 31, which as noted is rigid with the carriage structure. In the advancement and retraction of the carriage 22, therefore, it is the cylinder 65 which travels in relation to the piston rod 64 which is stationary.

During its reciprocation on the rails 21, the pairs of rollers 23 prevent vertical displacement of the carriage 22. Simultaneously, the carriage is laterally restrained and guided by a cylindrical longitudinal guide bar 70 fixedly held in pillow blocks 71 attached to the machine base 20. The bar 70 is between and parallel to the two horizontal guide rails 21, FIG. 3. Ball bushings 72 attached to the cross bars 25 of the carriage ride along the bar 70 to guide the carriage laterally.

Figure 9:
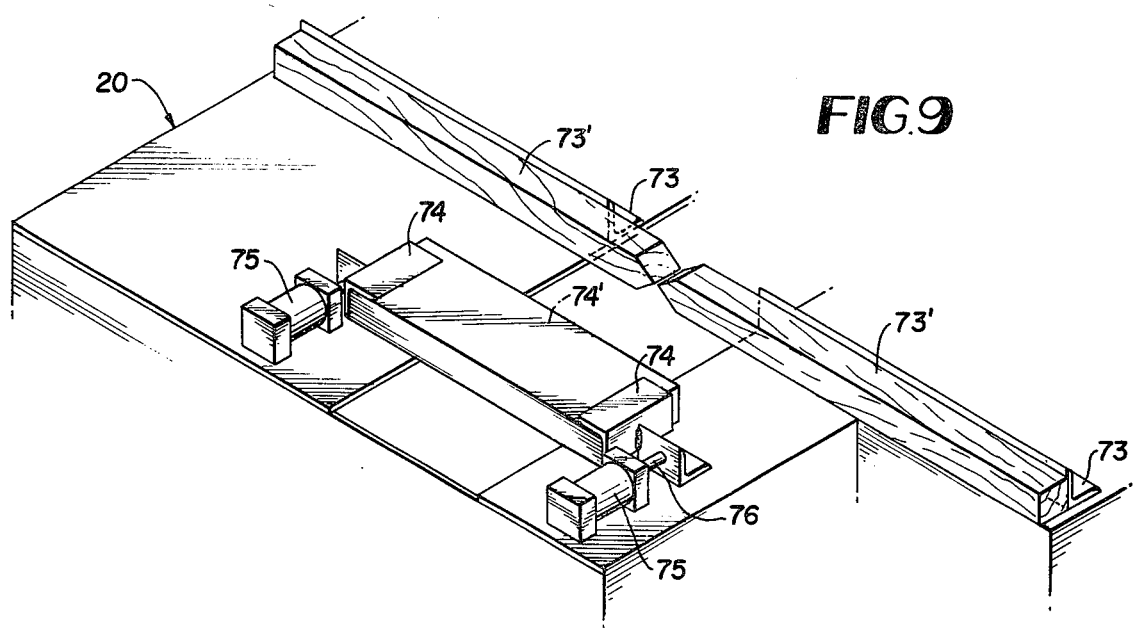
FIG. 9 is a fragmentary perspective view of a workpiece clamping arrangement.
Figure 10:
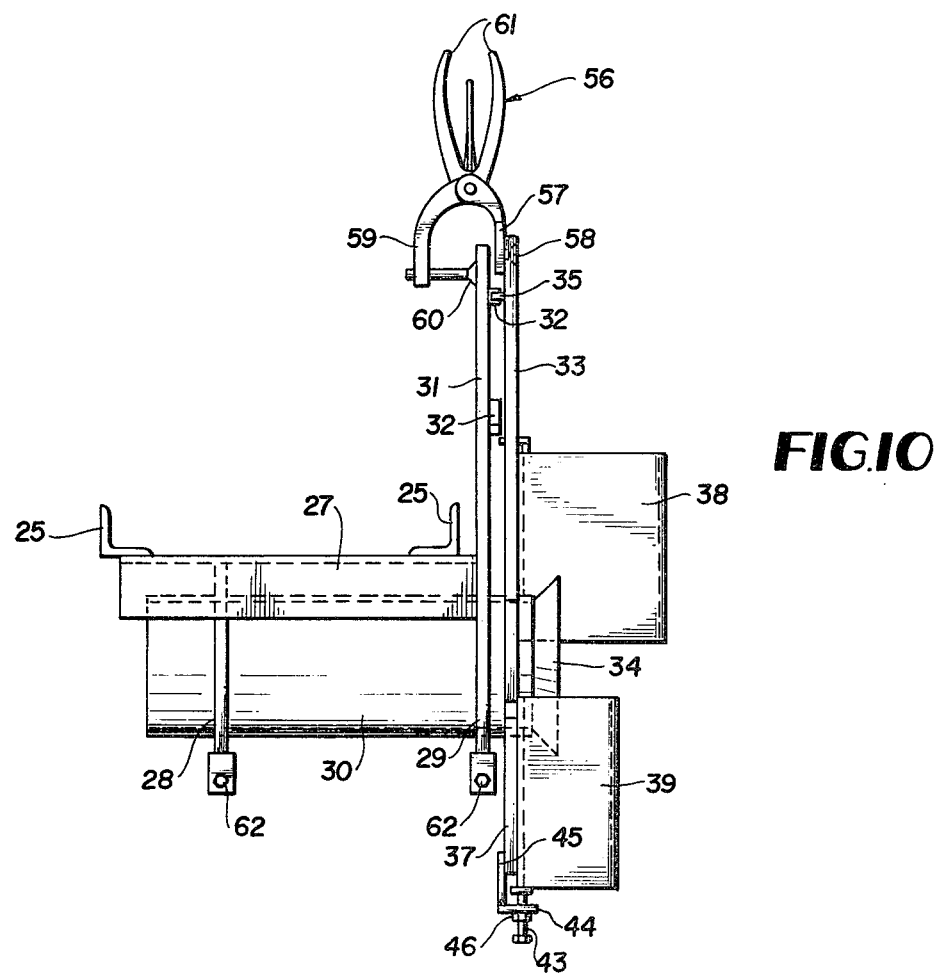
FIG. 10 is a side elevation of the adjustable mount for the two cutter heads and showing a quick release locking clamp.
Figure 11:
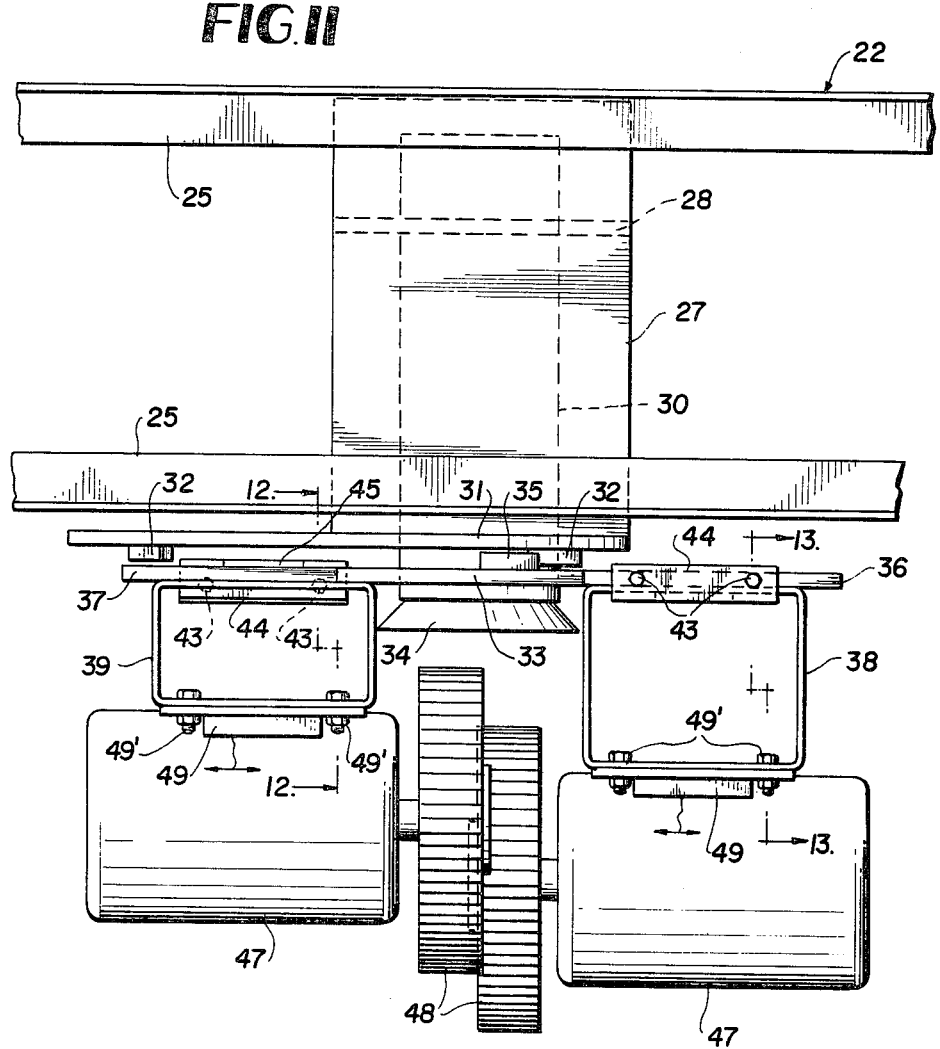
FIG. 11 is a fragmentary plan view of the mount.
Figure 12:
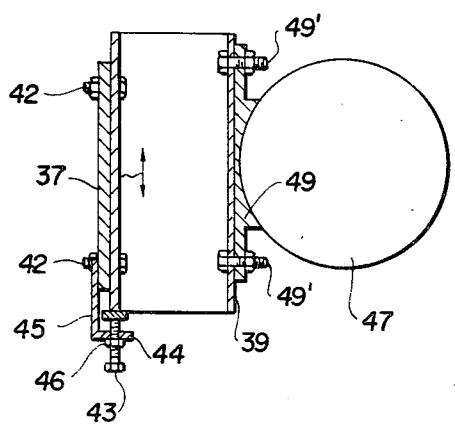
FIG. 12 is a fragmentary vertical section taken on line 12—12 of FIG. 11.
Figure 13:
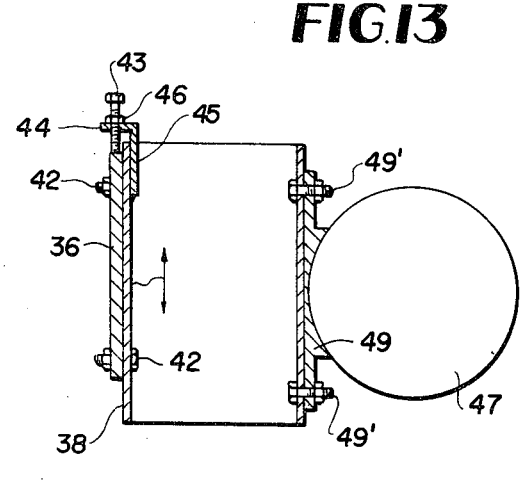
FIG. 13 is a similar section taken on line 13—13 of FIG. 11.

Near the forward end of the machine base 20, FIG. 9, a transverse horizontal centrally divided fixed workpiece fence 73—73 is welded or otherwise secured to the machine base. Wooden face sections 73'—73' are mechanically attached to the fence structure, as shown. In opposing relation to this workpiece fence arrangement on the machine base at its downstream end, is a movable wooden workpiece clamp element 74', mechanically attached to support elements 74 operated in unison by pneumatic cylinders 75, fixedly on the base 20, and having rods 76 carrying the elements 74. When these rods are extended by the cylinders 75, the workpiece 51, such as a 2 × 4, is securely clamped between the two wooden elements 73' of the fence and the opposing element 74' of the clamping means.

Figure 6:
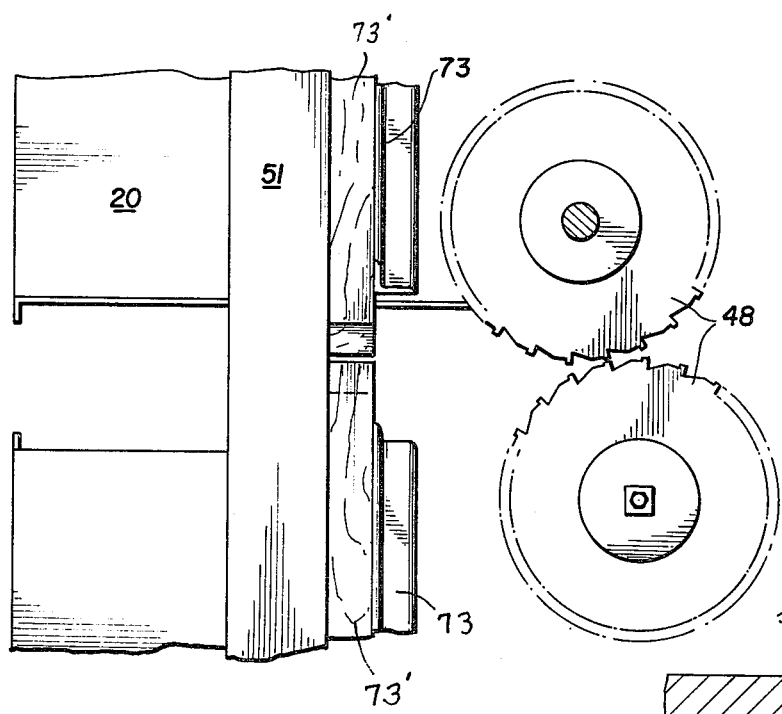
FIG. 6 is a fragmentary section taken on line 6—6 of FIG. 5.

The mechanical or structural basic components of the machine can now be seen to comprise essentially the machine base 20, longitudinally shiftable carriage 22, angularly adjustable and lockable coacting Dado heads 48 and their motors 47 with adjustable mounting means on the carriage, a linear actuator 63 for the carriage 22 and a coordinated workpiece clamp arrangement including fixed and movable elements 73 and 73' and 74 and 74', above described. The machine, therefore, is basically quite simple, sturdy in construction, and incorporates all critical adjustments as described in detail. The adjustable mounting means for the motors 47 and Dado cutting heads 48 is particularly important in positioning the rotary blades 48, or cutting heads, in slightly overlapped relation at the meeting peripheral edges while the rotational axes of the blades and their motors are parallel and offset laterally, FIG. 5. Also, the cutter heads or blades 48 are offset axially, as shown in FIG. 6, so that the two rotating heads can cut through opposite sides of a clamped workpiece 51 to produce simultaneously the four end faces 53 shown in FIG. 7 as the carriage moves the cutter heads across the workpiece. It can also be seen in FIGS. 1, 5 and 7 that one of the Dado rotary cutter heads 48 during use is above the workpiece 51 while the other cutter head is below the workpiece. The axes of rotation of the two heads 48 are parallel and both arranged at 45° to the workpiece 51 in the drawing illustration. The particular angle of cut, however, can be adjusted by rotating the plate 33 and tube 30 relative to the sector plate 31, as previously described. When the carriage 22 is reciprocated on the rails 21, it can be seen that the two coacting cutter heads 48 in slightly overlapping relationship, FIG. 7, will completely sever the workpiece 51 to produce the two pieces 52 with a pair accurately angled in faces 53 on each severed piece.

Drawing FIGS. 14 through 19 schematically illustrate the pneumatic-hydraulic controls for the apparatus. Certain elements depicted in FIGS. 14 through 19 are purposely omitted in FIGS. 1 through 13 in the interest of drawing simplicity and clarity.

Figure 14:
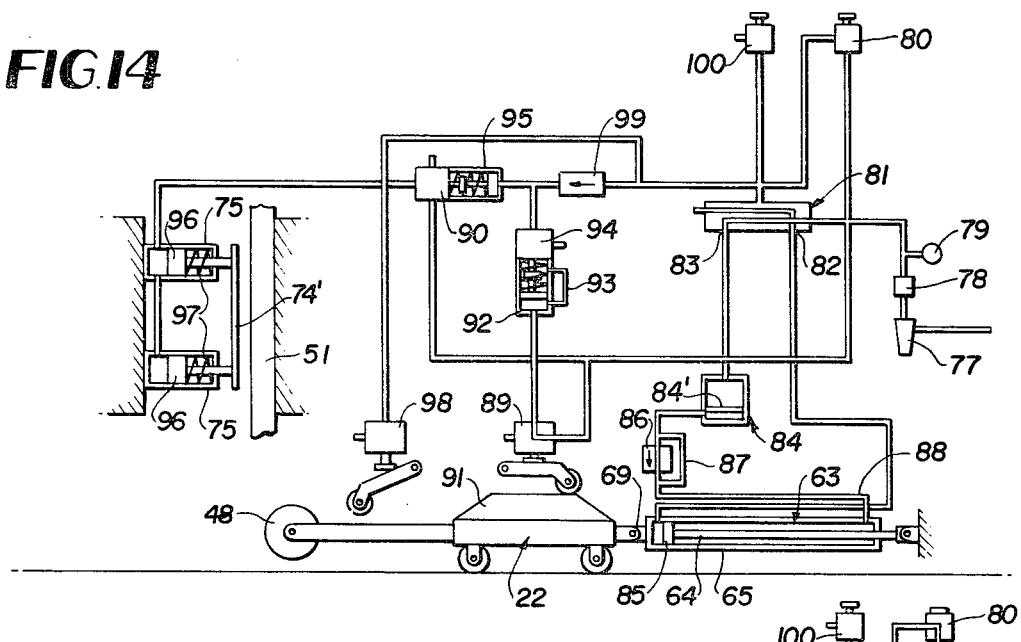
FIG. 14 is a schematic view of a hydro-pneumatic control system for the apparatus with the system at rest and the cutter carriage retracted.

FIG. 14 illustrates the system at rest with the carriage 22 fully retracted so that actuator cylinder 65 is fully telescoped over the rod 64, as is the case when the pressurized air supply has just been connected to the system.

In FIG. 14, high pressure air from any convenient remote source, not shown, is admitted through an air filter 77 and air pressure regulator 78. A gage 79 indicates the magnitude of system pressure which is adjusted by the regulator 78. A run cycle valve 80 is normally closed and does not permit high pressure air to pass through. The pilot port of actuator control valve 81, being downstream of run cycle valve 80, is therefore not pressurized, which causes port 82 of actuator control valve 81 to be open to exhaust and permits high pressure air to pass through port 83 of valve 81 and pressure hydraulic reservoir 84 including an interface element 84' which separates the pneumatic portion of the system from the hydraulic portion. This provides high pressure oil on the rear side of piston 85 in hydraulic actuator 63 through hydraulic check valve 86, flow restrictor 87 and conduit 88. Since port 82 of actuator control valve 81 is open to exhaust, the forward side of piston 85 is unpressurized, and the moving cylinder 65 of actuator 63 coupled to carriage 22 is biased to the retracted position due to high pressure in the cylinder 65 behind the piston 85. Thus, the Dado head cutters 48 which move with the carriage are retracted.

High pressure air is also admitted to a material clamp release valve 89 and to a material clamp valve 90. The material clamp release valve 89 is held open by a carriage mounted cam 91, allowing high pressure air to enter exhaust valve piston operator 92. Since this exhaust valve piston operator is being pressurized suddenly, only a small portion of the high pressure air flows through a bypass bleed line 93 to the downstream side of the exhaust valve piston operator 92, causing the piston to momentarily compress the return spring and valve stem push button which momentarily opens exhaust valve 94. After a sufficient amount of high pressure air traverses bypass bleed line 93 to the downstream side of the piston of exhaust valve piston operator 92, the differential pressure across the piston of the operator 92 will become sufficiently low to enable the return spring to retract the piston of operator 92 and allow the exhaust valve 94 to return to closed position. Since the system upstream from the exhaust valve 94 has not previously been pressurized, the momentary opening of exhaust valve 94 has no effect on the system.

The material clamp valve 90 is normally closed, and since the system upstream of the material clamp valve piston operator 95 has not previously been pressurized, the operator 95 is not pressurized and the material clamp valve 90 remains in the normally closed position and causes the system downstream of this valve to be open to exhaust. Since the system on the downstream side of valve 90 is open to exhaust causing material clamp cylinders 75 to be unpressurized, the pistons 96 of these cylinders are biased in retracted positions by piston return springs 97 of the cylinders 75, FIG. 14, and the material clamp is therefore released or retracted.

For the case where the carriage 22 had been in an intermediate position or in the extended position when the compressed air supply had just been connected to the system, wherein the material clamp release valve 89 was not held open by the carriage cam 91, or the reversing valve 98 was held open by the cam 91, the material clamp 74', etc. would still be in the retracted position and the carriage 22 and Dado cutters 48 would have been driven by hydraulic actuator 63 to the retracted position shown in FIG. 14. This is true since the material clamp release valve 89 in the closed position would have caused the exhaust valve piston operator 92 to open to exhaust as it was before connecting the air supply and the exhaust valve 94 would not have been opened momentarily, which would again have no effect on the system pressure upstream of the exhaust valve 94.

Also, the reversing valve 98 in the open position would have caused the system pressure at the pilot port of actuator control valve 81 to be open to exhaust as it was before connecting the air supply, which again would have no effect on system pressure upstream from the reversing valve 98.

Figure 15:
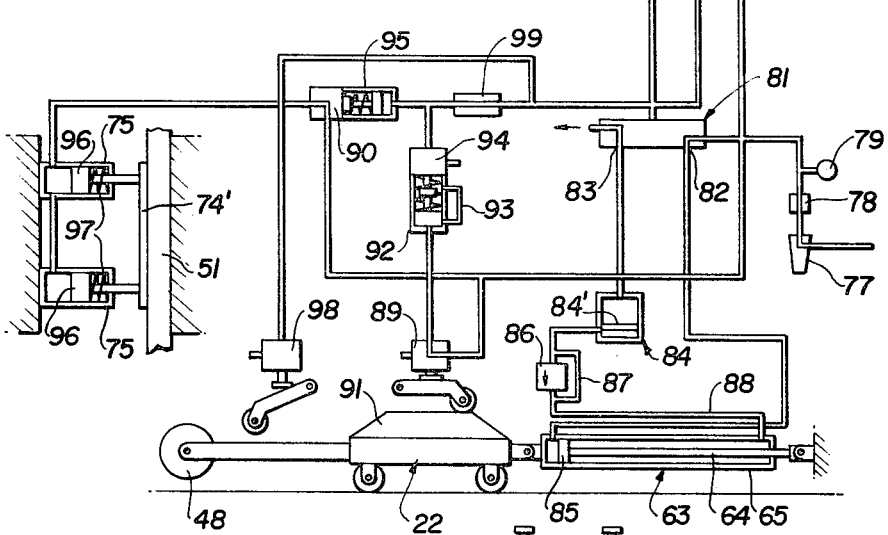
FIG. 15 is a further schematic view of the system at start-up immediately after the push button of the run cycle valve has been momentarily depressed to admit pressurized air to the pilot port of the actuator control valve.

FIG. 15 shows the actuation system after the push button operator of run cycle valve 80 has been momentarily depressed. High pressure air is admitted to the pilot port of actuator control valve 81 which causes port 83 to open to exhaust and permits high pressure air to pass through port 82 of the valve 81, providing high pressure to the forward side of actuator 63. Since port 83 is open to exhaust, the rear side of piston actuator 63 is unpressurized and the actuator cylinder 65, carriage 22 and Dado cutter blades 48 are biased toward the extended position due to high pressure applied forwardly of piston 85.

Pressurized air is also admitted to material clamp valve 90 and piston operator 95 thereof by means of a check valve 99. This causes the piston of material clamp valve piston operator 95 to compress the return spring and valve stem push button of material clamp valve 90 which opens this valve, permitting material clamp cylinders 75 to become pressurized. High pressure air applied to the pistons 96 of material clamp cylinders 75 causes the pistons to compress the return springs 97 and bias the clamp 74', etc. to the extended or active position as shown in FIG. 15.

Pressurized air is also permitted to pass through material clamp release valve 89 (as this valve is held open by carriage cam 91), supplying pressurized air to piston operator 92 of exhaust valve 94.

Since piston operator 92 was previously pressurized as in FIG. 14, both sides of the piston are pressurized by means of the bypass bleed 93. The return spring of piston operator 92 therefore biases the piston to the retracted position, such that the push button operator of exhaust valve 94 is not compressed and the exhaust valve remains closed. Since the exhaust valve 94 is closed, the pressurized air supplied to piston operator 95 of material clamp valve 90 is not permitted to exhaust and piston operator 95 of valve 90 remains compressed allowing the valve 90 to remain open and the cylinders 75 to remain pressurized. The reversing valve 98 is not compressed by the carriage cam 91 and remains normally closed, preventing pressurized air downstream of the run cycle valve 80 from exhausting.

Figure 16:
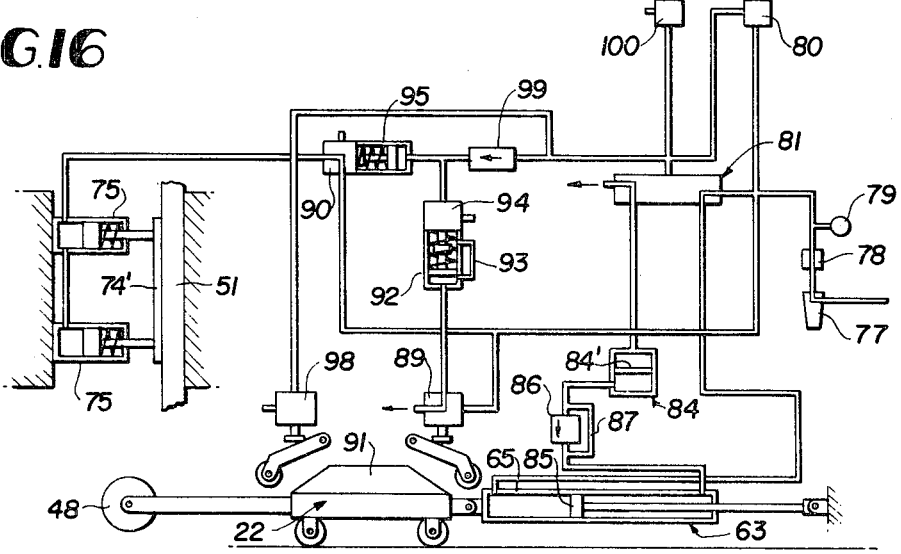
FIG. 16 is a further schematic view of the system with the carriage advancing and the material clamp release valve closed, releasing pressurized air from the exhaust valve piston operator.

Referring to FIG. 16, as carriage cam 91 advances, material clamp release valve 89 is allowed to close, releasing pressurized air from exhaust valve piston operator 92. Prior to air exhausting from the exhaust valve piston operator 92, the air was pressurized on both sides of the piston of this operator by the bypass bleed 93. Immediately after pressurized air is released on the input side of exhaust valve piston operator 92, pressurized air still exists on the valve side. This air exerts a force to move the piston of operator 92 to closed position. Since the exhaust valve 94 is already closed, no change occurs in the pressurized air downstream from the run cycle valve 80.

As carriage 22 advances, FIG. 16, Dado cutters 48 begin cutting into the workpiece 51 pulling carriage 22 at a faster rate than would normally occur were the workpiece not being engaged. Check valve 86 prevents hydraulic fluid from passing from the linear actuator 63 to the reservoir 84 except through restrictor bypass 87. As a result of restrictor bypass 87 and check valve 86, the cylinder of linear actuator 63 advances at a slower rate than it returns. The cutting rate by Dado cutters 48 can be adjusted to the maximum rate for an acceptable cut. The check valve 86 allows full unrestricted flow of hydraulic fluid on the return cycle. As a result, overall cycle time is reduced, and the cutting rate is increased.

Figure 17:
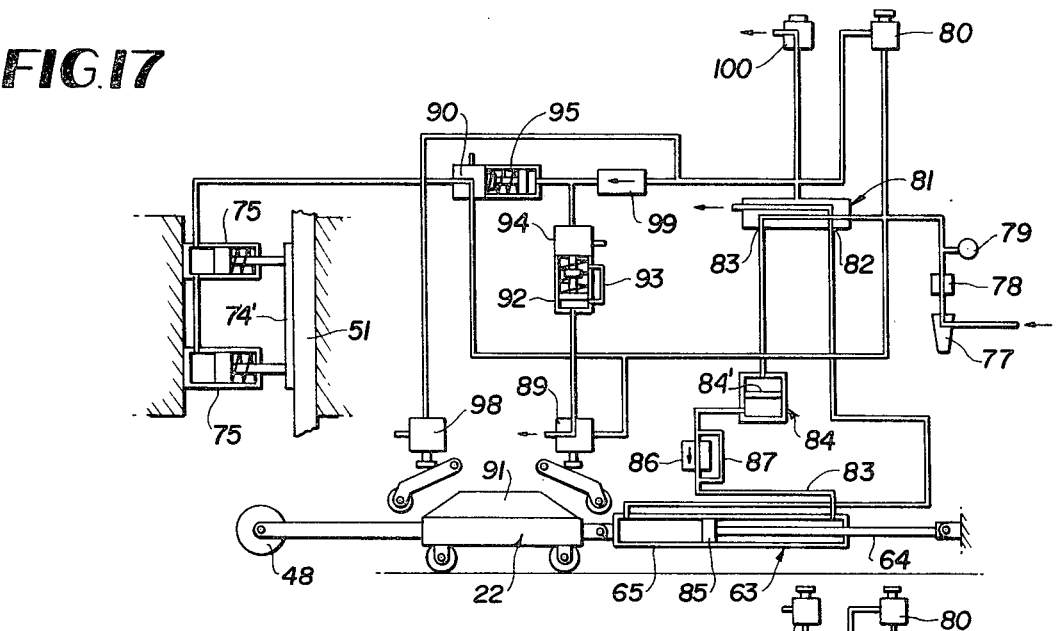
FIG. 17 is a further schematic view of the system with the emergency return valve open to exhaust pressurized air downstream from the run cycle valve.

In FIG. 17, an emergency return valve 100 has been opened, which exhausts pressurized air downstream of run cycle valve 80. Check valve 99 prevents pressurized air from being released downstream to material clamp valve piston operator 95. The pilot of four-way actuator control valve 81 switches pressurized air to port 83 and exhausts air from port 82. Pressurized air forces hydraulic fluid from reservoir 84 through check valve 86 and restrictor bypass 87 to the rear of piston 85, causing cylinder 65 to retract with carriage 22.

Figure 18:
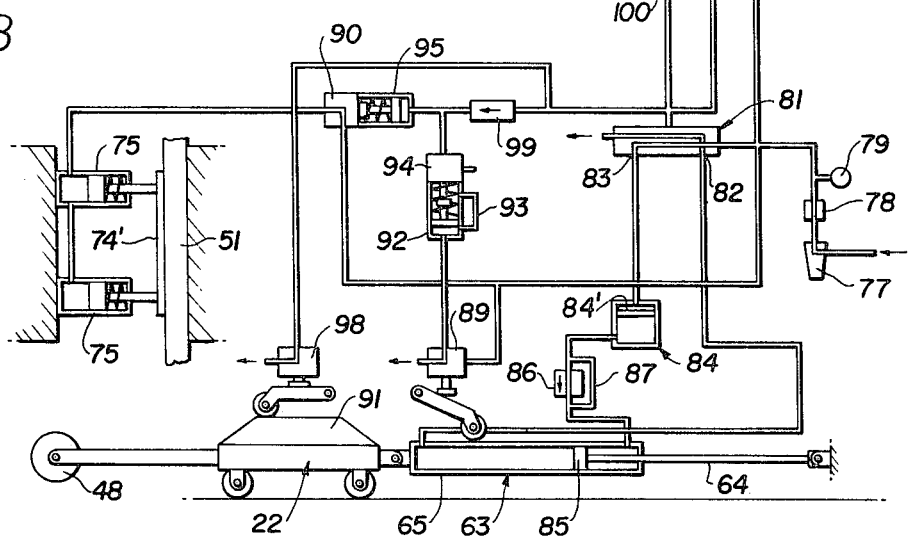
FIG. 18 is a similar schematic view of the system with the carriage advanced until its cam has opened the reversing valve.
Figure 19:
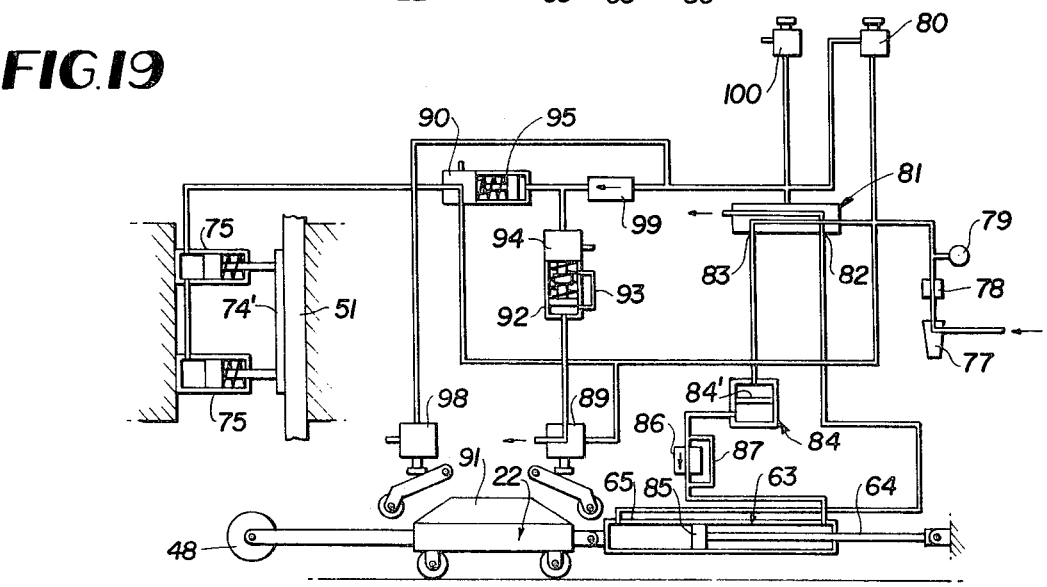
FIG. 19 is a further schematic view of the system with the carriage retracted until its cam allows closing of the reversing valve.

In FIG. 18, carriage 22 has advanced until cam 91 has opened reversing valve 98. Pressurized air downstream from run cycle valve 80 is exhausted through reversing valve 98. Check valve 99 prevents air from being released downstream to material clamp valve piston operator 95. The pilot of four-way actuator control valve 81 switches pressurized air to port 83 and exhausts air from port 82. Pressurized air forces hydraulic fluid from reservoir 84 through check valve 86 and restrictor bypass 87 to the rod side of piston 85 causing cylinder 65 to retract along with carriage 22. As the carriage retracts, carriage cam 91 allows reversing valve 98 to close as depicted in FIG. 19. With reversing valve 98 closed, no change occurs downstream from one cycle valve 80.

Carriage 22 continues to retract until material clamp release valve 89 is opened by cam 91 when the parts are again arranged as shown in FIG. 14. Pressurized air passes through the valve 89 to exhaust valve piston operator 92. The sudden increase in pressure on the piston of the unit 92 causes momentary opening of exhaust valve 94, reducing pressure on the piston of material clamp piston operator 95. The piston return spring of this unit causes material clamp valve 90 to open, exhausting pressurized air downstream of the valve 90, in turn causing material clamp cylinders to retract the clamp means 74', etc. and release the workpiece 51. The system is conditioned again as in FIG. 14.

By means of the hydro-pneumatic system shown in FIGS. 14 to 19, the cutting apparatus can be operated rapidly and efficiently in a controlled manner and on an automatic repetitive basis for maximum production of accurately cut truss web components or the like. The advantages of the invention over the known prior art should be readily apparent to those skilled in the art without the necessity for further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An apparatus for cutting truss web components and the like comprising a support base, a carriage guidably mounted on the support base for fore and aft movement on a linear path, a power actuator coupled with the carriage to move it forwardly and rearwardly on the support base, a workpiece clamp means on the support base for positioning and holding a workpiece across the path of movement of the carriage, a rotationally adjustable member on the carriage having its axis of rotation extending longitudinally of the carriage, means to limit the extent of rotation of said member in opposite directions and to releasably lock the member in selected adjusted positions, a pair of rotary cutter heads mounted on the rotationally adjustable member and movable with the carriage and member relative to a workpiece in the clamp means, means to independently adjust each rotary cutter head in two directions on said rotationally adjustable member so that the rotary blades of said heads can be accurately positioned in offset and slightly overlapping relationship to enable the blades during movement of the carriage to cut a workpiece into two sections and simultaneously produce a pair of right angular end faces on each workpiece section, and means to releasably secure said rotationally adjustable member in a selected adjusted position.

2. An apparatus for cutting truss web components and the like as defined in claim 1, and said rotationally adjustable member including a plate member, extension plates projecting from opposite sides of said plate member, a pair of sleeve mounting brackets on said extension plates having corresponding walls lying against the extension plates, means to adjust the sleeve mounting brackets in one direction on the extension plates, said rotary cutter heads having drive motors and said drive motors having their housings lying against second walls of the sleeve mounting brackets away from said extension plates, and means to adjust said housings in a second direction on said second walls substantially at right angles to said one direction of adjustment on said plate extensions.

3. An apparatus for cutting truss web components and the like as defined in claim 2, and an open-ended tube attached to said plate member and having a mouth disposed near the rotary blades of said cutter heads, whereby cuttings produced by said blades are propelled through said tube, said tube having its axis parallel to the movement axis of said carriage.

4. An apparatus for cutting truss web components and the like as defined in claim 1, and adjustable support bracket means for said rotary cutter heads on said rotationally adjustable member allowing the blades of the cutter heads to be arranged above and below a workpiece to be cut on parallel inclined axes of rotation with the blades in axially offset relationship and having slightly overlapping peripheries.

5. An apparatus for cutting truss web components and the like as defined in claim 4, and a stop element on said rotationally adjustable member, a fixed coacting member on said carriage in spaced opposed relationship to the rotationally adjustable member, and a pair of stop elements on said fixed coacting member in the rotational path of movement of said stop element on the rotationally adjustable member.

6. An apparatus for cutting truss web components and the like as defined in claim 5, and said rotationally adjustable and coacting fixed members comprising a pair of opposing plates, and a quick release manual clamp means on one of the plates and having a movable clamping element adapted to engage the opposing plate releasably, whereby the two plates can be held releasably in relative rotationally adjusted positions.

7. An apparatus for cutting truss web components and the like as defined in claim 1, and said power actuator comprising an extensible and retractable linear actuator having one component coupled to said carriage and a second component coupled to said support base, the axis of said linear actuator being parallel to the movement axis of said carriage.

8. An apparatus for cutting truss web components and the like as defined in claim 1, and a fluid control system including a regulated fluid source connected with said power actuator and said workpiece clamp means whereby the power actuator and clamp means are operated in timed relationship during a repetitive cycle of operation of the apparatus.

9. An apparatus for cutting lumber workpieces into truss web components comprising a support base, a carriage mounted on the support base for movement in opposite directions thereon, actuator means connected with the carriage to move it in said two directions on the support base, a lumber workpiece clamp means on the support base, a pair of coacting motorized rotary cutters mounted on the carriage for movement with the carriage across the lumber workpiece held in said clamp means, and adjustable mounting means for said motorized rotary cutters on the carriage supporting the cutters in fixed relation above and below the lumber workpiece with the cutters on parallel offset axes which are inclined relative to the lumber workpiece, the cutters also being held in axially offset relationship with their peripheries overlapped.

10. An apparatus for cutting lumber workpieces into truss web components as defined in claim 9, and said adjustable mounting means for said motorized rotary cutters comprising a rotational support member having an axis of rotation paralleling the movement axis of said carriage, and means to releasably secure the rotational support member in selected adjusted positions between fixed limits of rotation.

11. An apparatus for cutting lumber workpieces into truss web components as defined in claim 10, and said adjustable mounting means additionally comprising on said rotational support member a pair of independently adjustable mounting brackets for said motorized rotary cutters allowing each cutter to be adjusted on the rotational support member in two coordinate directions.

12. An apparatus for cutting lumber workpieces into truss web components as defined in claim 9, and said rotary cutters comprising a pair of Dado blade cutters.

13. An apparatus for cutting lumber workpieces into truss web components as defined in claim 11, wherein said mounting brackets each have a pair of spaced walls with one wall adjacent said rotational support member and the other wall adjacent a housing part of a rotary cutter, said walls having adjusting slots in two coordinate directions, and bolt means engaged through said slots and coupling the walls of the mounting brackets to the rotational support member and housing part respectively.

14. An apparatus for cutting lumber workpieces into truss web components as defined in claim 13, and fine linear adjusting means for said mounting brackets on the rotational support member longitudinally of the slots in the walls of the mounting brackets adjacent to said rotational support member.

15. An apparatus for cutting lumber workpieces into truss web components as defined in claim 14, and said fine linear adjusting means comprising adjusting screws and lock nuts.

16. An apparatus for cutting lumber workpieces into truss web components as defined in claim 9, and a fluid control circuit connected with said actuator means and said lumber workpiece clamp means whereby the latter are operated in predetermined timed relationship relative to each other during the operating cycle of the apparatus.

17. An apparatus for cutting lumber workpieces into truss web comprises as defined in claim 16, and wherein said actuator means connected with the carriage is an extensible and retractable hydraulic cylinder and said lumber workpiece clamp means comprises at least one extensible and retractable pneuamtic cylinder, said fluid control circuit including a regulated compressed air supply, a hydraulic reservoir means interposed between the compressed air supply and said first-named hydraulic cylinder, an interface element in said reservoir serving to separate compressed air and hydraulic fluid therein, a carriage actuator control valve coupled between said reservoir means and said regulated compressed air supply, a run cycle valve connected in said fluid control circuit in parallel relationship to said carriage actuator control valve, a workpiece clamp valve coupled in said fluid control circuit downstream from said run cycle and said carriage actuator control valves, a workpiece clamp release valve in said control circuit between said compressed air supply and said workpiece clamp valve, said workpiece clamp pneumatic cylinder being biased normally to a workpiece release position, a reversing release valve in said fluid control circuit downstream from the run cycle valve, and cam operated means responding to linear movements of said carriage and being operatively coupled with said workpiece clamp release and said reversing valves.

18. An apparatus for cutting lumber workpieces into truss web components as defined in claim 17, and a check valve coupled in said fluid control circuit between said hydraulic reservoir means and first-named hydraulic cylinder.

19. An apparatus for cutting lumber workpieces into truss web components as defined in claim 18, and a hydraulic fluid restrictor bypass connected in parallel with said check valve in said control circuit.

20. An apparatus for cutting lumber workpieces into truss web components as defined in claim 17, and an exhaust valve including a piston operator means connected in said fluid control circuit between the workpiece clamp release valve and the workpiece clamp valve.

21. An apparatus for cutting lumber workpieces into truss web components as defined in claim 17, and a piston operator for said workpiece clamp valve, the workpiece clamp valve being normally closed, said last-named piston operator having a fluid connection with said run cycle valve, and a check valve upstream from the last-named piston operator and between the same and the run cycle valve.

22. An apparatus for cutting lumber workpieces into truss web components as defined in claim 17, and said lumber workpiece clamp means comprising a pair of parallel connected pneumatic cylinders having pistons which are spring-biased toward workpiece release positions.

23. An apparatus for cutting lumber workpieces into truss web components as defined in claim 17, and an emergency carriage return valve adapted to exhaust compressed air downstream of the run cycle valve and having a connection with said carriage actuator control valve.

24. An apparatus for cutting lumber into truss web components as defined in claim 17, and means causing said actuator means to revert automatically to its starting position when compressed air is first connected to the fluid control circuit from said regulated compressed air supply.

* * * * *